(12) United States Patent
Lätsch et al.

(10) Patent No.: US 6,303,721 B1
(45) Date of Patent: Oct. 16, 2001

(54) PROCESS FOR PRODUCING DIENE POLYMER SOLUTIONS IN VINYL AROMATIC MONOMERS

(75) Inventors: Stefan Lätsch, Bad Dürkheim; Wolfgang Fischer, Ludwigshafen; Hermann Gausepohl, Mutterstadt; Volker Warzelhan, Weisenheim; Christian Schade, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/242,466

(22) PCT Filed: Aug. 18, 1997

(86) PCT No.: PCT/EP97/04498

§ 371 Date: Feb. 17, 1999

§ 102(e) Date: Feb. 17, 1999

(87) PCT Pub. No.: WO98/07766

PCT Pub. Date: Feb. 26, 1998

(30) Foreign Application Priority Data

Aug. 19, 1996 (DE) ................................. 196 33 272
Aug. 19, 1996 (DE) ................................. 196 33 273
May 22, 1997 (DE) ................................. 197 21 403

(51) Int. Cl.[7] ............................. C08F 4/52; C08F 279/06
(52) U.S. Cl. ......................... 526/176; 526/173; 526/177; 526/178; 525/53; 525/271; 525/308; 525/310; 525/316
(58) Field of Search .................................. 526/173, 176, 526/177, 178; 525/53, 316, 271, 308, 310

(56) References Cited

U.S. PATENT DOCUMENTS

| | | | |
|---|---|---|---|
| 3,264,374 | 8/1966 | Jones | 260/880 |
| 3,278,508 | 10/1966 | Kahle | 260/94 |
| 3,716,495 | 2/1973 | Hsieh | 252/431 |
| 3,826,790 | 7/1974 | Van Der Ven | 260/94 |
| 4,153,647 | 5/1979 | Glukhovskoi | 260/880 |
| 4,567,232 | * 1/1986 | Echte et al. | 525/53 |

FOREIGN PATENT DOCUMENTS

| | | |
|---|---|---|
| 059231 | 9/1982 | (EP) . |
| 304088 | 2/1989 | (EP) . |
| 334715 | 9/1989 | (EP) . |
| 1013205 | 12/1965 | (GB) . |
| 97/33923 | 9/1997 | (WO) . |

OTHER PUBLICATIONS

Hackh's Chem. Dictionary, 4th ed, McGraw–Hill, N.Y., pp. 27, 62 (1969).*

Welch, *J. Amer. Chem. Soc.*, vol. 82, 1960, pp. 6000–6005.

Hsieh et al., *Macromolecules*, vol. 19, 1966, pp. 299–304.

* cited by examiner

Primary Examiner—Fred Teskin
(74) Attorney, Agent, or Firm—Keil & Weinkauf

(57) ABSTRACT

The anionic polymerization of dienes or copolymers of dienes and vinylaromatic monomers in a vinylaromatic monomer or monomer mixture to give homopolydienes or copolymers or mixed homopolydienes and copolymers is carried out in the presence of a metal alkyl or aryl of an element having a valence of at least two without addition of Lewis bases.

10 Claims, No Drawings

PROCESS FOR PRODUCING DIENE POLYMER SOLUTIONS IN VINYL AROMATIC MONOMERS

The present invention relates to a process for the anionic polymerization of dienes or copolymerization of dienes and vinylaromatic monomers in a vinylaromatic monomer or monomer mixture to give homopolydienes or copolymers or mixed homopolydienes and copolymers.

The invention further relates to a diene polymer solution, its use for preparing molding compositions comprising vinylaromatic monomers and also a continuous process for preparing impact-modified, thermoplastic molding compositions.

It is generally known that anionic polymerization proceeds completely, ie. to complete conversion, but also very quickly. The conversion rate can, apart from selection of a very low temperature, only be reduced by selecting a lower concentration of the polymerization initiator, but this forms only few, very long chain molecules. Owing to the considerable evolution of heat and the difficulty of removing the heat from a viscous solution, limiting the reaction temperature is not very effective.

An excessively high reaction temperature has particularly disadvantageous consequences, especially in block copolymerization, because thermal termination interferes with the formation of uniform block copolymers and, if it is intended to follow the polymerization with a coupling reaction, the coupling yield would be unfavorably low.

The temperature therefore has to be controlled by appropriate dilution of the monomers, but this makes the reaction space required unnecessarily large, ie. the anionic polymerization can, despite the high reaction rate with can be achieved, only be operated with a relatively low space-time yield.

Various continuous and batches processes in solution or suspension are known for preparing high-impact polystyrene. In these processes, a rubber, usually polybutadiene, is dissolved in monomeric styrene which has been polymerized to a conversion of about 30% in a preliminary reaction. The formation of polystyrene and the simultaneous decrease in the concentration of monomeric styrene leads to a change in the phase coherence. During this phenomenon known as "phase inversion", grafting reactions also occur on the polybutadiene and these, together with the intensity of stirring and the viscosity, influence the formation of the disperse soft phase. In the subsequent main polymerization, the polystyrene matrix is built up. Such processes carried out in various types of reactor are described, for example, in A. Echte, Handbuch der technischen Polymerchemie, VCH Verlagsgesellschaft Weinheim 1993, pages 484–489 and U.S. Pat. Nos. 2,727,884 and 3,903,202.

In these processes, the separately prepared rubber has to be comminuted and dissolved in a complicated procedure and the polybutadiene rubber solution in styrene obtained in this way has to be filtered to remove gel particles before the polymerization.

Various attempts have therefore been made to prepare the necessary rubber solution in styrene directly by anionic polymerization of butadiene or butadiene/styrene in nonpolar solvents such as cyclohexane or ethylbenzene and subsequent addition of styrene (GB 1 013 205, EP-A-0 334 715 and U.S. Pat. No. 4,153,647) or by incomplete conversion of butadiene in styrene (EP-A 0 059 231). The block rubber thus prepared either has to be purified by precipitation or else the solvent and other volatile materials, in particular monomeric butadiene, have to be distilled off. In addition, owing to the high solution viscosity, only relatively dilute rubber solutions can be handled, which results in a high solvent consumption, purification costs and energy consumption.

EP-A 0 304 088 describes a process for the selective polymerization of conjugated dienes in a mixture of dienes and vinylaromatic compounds. The catalysts used display virtually no polymerization activity toward the vinylaromatic compound.

U.S. Pat. No. 3,264,374 describes the preparation of polybutadiene in styrene. However, the experiments reported there without any indication of the scale cannot be controlled on an industrially relevant scale because of the abovementioned problems of heat removal. In addition, the viscosities are very high at the relatively low reaction temperatures.

The influence of Lewis acids and Lewis bases on the reaction rate in anionic polymerization has been described in Welch, Journal of the American Chemical Society, Vol 82 (1960), pages 6000–6005. It was found that small amounts of Lewis bases such as ethers and amines accelerate the n-butyllithium-initiated polymerization of styrene, while Lewis acids such as zinc alkyls and aluminum alkyls can reduce the polymerization rate. Hsieh and Wang too, in Macromolecules, Vol 19 (1966), pages 299–304 describe the polymerization-retarding action of dibutylmagnesium by means of complex formation with the alkyllithium initiator or the living polymer chain without influencing the stereochemistry.

U.S. Pat. No. 3,716,495 discloses initiator compositions for the polymerization of conjugated dienes and vinylaromatics, in which a more effective utilization of the alkyllithium as initiator is achieved by addition of a metal alkyl such as diethylzinc and polar compounds such as ethers or amines. Owing to the large amounts of solvent required, relatively low temperatures and long reaction times in the range of a few hours, the space-time yields are correspondingly low.

U.S. Pat. No. 3,826,790 discloses a process for the polymerization of conjugated dienes and, if desired, monovinylaromatic hydrocarbons in solution to give polymers having an increased cis-1,4 content. The initiator employed for this purpose contains an alkyllithium compound and a trihydrocarbylboron compound.

It is an object of the present invention to find a process for the anionic polymerization of dienes and vinylaromatic monomers which, at high monomer concentration, can be operated particularly economically and enables vinylaromatic-monomer solutions of diene polymers which are low in diene monomers to be prepared for further processing to give molding compositions. The process should use predominantly monomeric starting materials and make it possible to achieve high space-time yields. Furthermore, reliable control of the polymerization rate and thus the temperature should be made possible. In addition, the invention should provide a continuous process for preparing impact-modified molding compositions having a low residual monomer content.

We have found that this object is achieved by a process for the anionic polymerization of dienes or copolymerization of dienes and vinylaromatic monomers in a vinylaromatic monomer or monomer mixture to give homopolydienes or copolymers or mixed homopolydienes and copolymers, wherein the polymerization is carried out in the presence of a metal alkyl or aryl of an element having a valence of at least two without addition of Lewis bases.

Furthermore, we have found a diene polymer solution, its use for preparing molding compositions comprising vinylaromatic monomers, in particular high-impact polystyrene, acrylonitrile-butadiene-styrene polymers and methyl methacrylate-butadiene-styrene copolymers and also a process for the continuous preparation of impact-modified, thermoplastic molding compositions which comprise a soft phrase comprising a diene polymer dispersed in a hard vinylaromatic matrix, which comprises preparing, as described in the introduction, the diene polymer required for the formation of the soft phase in a first reaction zone, feeding the diene polymer obtained in this way, either directly or after addition of a termination or coupling agent, to a second reaction zone in which, if desired with addition of further vinyl monomers in an amount which is sufficient to achieve phase inversion and, if desired, further initiators and/or solvents, anionic or free-radical polymerization is carried out until phase inversion occurs and in a third reaction zone, anionic or free-radical polymerization is continued until complete with the amount of vinylaromatic monomer required to form the impact-modified thermoplastic molding composition.

The process can be applied to the customary anionically polymerizable diene monomers which meet the usual purity requirements, especially the absence of polar substances.

Preferred monomers are butadiene, isoprene, 2,3-dimethylbutadiene, 1,3-pentadiene, 1,3-hexadiene or piperylene or mixtures thereof.

Suitable vinylaromatic monomers are, for example, styrene, α-methylstyrene, p-methylstyrene, ethylstyrene, tert-butylstyrene, vinyltoluene, vinylnaphthalene or 1,1-diphenylethylene or mixtures thereof. These can be used as comonomers and also as "solvents" or "solvent component" for the process of the present invention. Particular preference is given to using styrene as "solvent" or "solvent component".

The diene is generally used in amounts of 2–70% by weight, preferably 5–35% by weight, particularly preferably 15–25% by weight, based on the sum of all monomers.

For practical reasons, a small amount of a further solvent can be used. Suitable further solvents are the aliphatic, cycloaliphatic or aromatic hydrocarbons having from 4 to 12 carbon atoms which are customary for anionic polymerization, for example pentane, hexane, heptane, cyclohexane, methylcyclohexane, isooctane, benzene, alkylbenzenes such as toluene, xylene and ethylbenzene or decalin or suitable mixtures. The solvent should naturally have the high purity typically required for such a process. To remove proton-active substances, they can be, for example, dried over aluminum oxide or molecular sieves and distilled before use. The solvent from the process is preferably reused after condensation and the purification mentioned. If a further solvent is used, the amount added is generally less than 40% by volume, preferably less than 20% by volume and very particularly preferably less than 10% by volume, based on the vinylaromatic monomer or monomer mixture.

Initiators used are the monofunctional, bifunctional or multifunctional alkali metal alkyls or aryls customary for anionic polymerization. Use is advantageously made of organolithium compounds such as ethyllithium, propyllithium, isopropyllithium, n-butyllithium, sec-butyllithium, tert-butyllithium, phenyllithium, diphenylhexyllithium, hexamethylenedilithium, butadienyllithium, isoprenyllithium or polystyryllithium or the multifunctional organolithium compounds 1,4-dilithiobutane, 1,4-dilithio-2-butene or 1,4-dilithiobenzene. The amount of initiator required is generally in the range from 0.002 to 5 mol percent, based on the amount of monomer to be polymerized.

As metal alkyl or aryl of an at least divalent element, use is advantageously made of compounds of the formula (I)

$$R_nM \qquad (I)$$

where

M is an element of main group II or III or transition group II of the Periodic Table, R is hydrogen, halogen, $C_1$–$C_{20}$-alkyl or $C_6$–$C_{20}$-aryl, where radicals R can be identical or different, and n is 2 or 3, corresponding to the valence of the element M.

M is preferably one of the elements Be, Mg, Ca, Sr, Ba, B, Al, Ga, In, Tl, Zn, Cd, Hg, particularly preferably magnesium, aluminum, boron or zinc. Possible radicals R are, in particular, hydrogen, halogen and $C_1$–$C_{12}$-alkyl, for example ethyl, propyl, n-, i- or t-butyl, octyl or dodecyl, and also $C_6$–$C_{10}$-aryl, for example phenyl. Very particular preference is given to using the commercially available products diethylzinc, butylethylmagnesium, dibutylmagnesium, dihexylmagnesium, butyloctylmagnesium, triisobutylaluminum, trihexylaluminum, triethylaluminum, trimethylaluminum, diethylaluminum chloride and diethylaluminum hydride. Of course, it is also possible to use mixtures of compounds of the formula (I).

Addition of an organometallic compound of an element having a valence of at least two enables the reaction rate to be reduced sufficiently for the heat of polymerization to be controlled even at a high monomer concentration without adverse effects on the polymer properties, so that, for example, it is possible to carry out an isothermal polymerization while at the same time achieving a high space-time yield.

The ratio of the initiator to the metal alkyl or aryl according to the present invention depends on the desired polymerization temperature and polymerization rate. The metal alkyl or aryl according to the present invention is used, for example, in a molar ratio of from 0.5:1 to 50:1, preferably from 1:1 to 30:1, particularly preferably from 1:1 to 10:1, based on the amount of initiator. Since the molecular weight of the polymers does not depend only on the molar amount of the initiator, as is usually the case in anionic polymerization, but can also be influenced by the type and amount of the metal alkyl or aryl used according to the present invention, preliminary experiments are advantageously carried out. If, for example, the combination of butyllithium as initiator and dibutylmagnesium as component for controlling the reaction rate is employed, the molar ratio of Li:Mg selected is advantageously from 0.02:1 to 2:1.

In a preferred embodiment, the alkali metal alkyls used as initiators are dissolved together with the metal alkyl or aryl compounds employed according to the present invention in a hydrocarbon, for example n-hexane, n-heptane or cyclohexane, and added in the first reaction zone to initiate the polymerization. If desired, a solubilizer, for example toluene, ethylbenzene, xylene or diphenylethylene, can be added at thus juncture in order to prevent precipitation of one of the components from this initiator solution.

To prevent formation of wall deposits and "popcorn", gel inhibitors such as hydrocarbon halides, silicon halides and 1,2-diolefins may, if desired, also be added to the polymerization mixture. The amounts used depend on the compound employed in the particular case. The preferred 1,2-butadiene is generally used in amounts of from about 100 to about 3000 ppm.

After the build-up of the molecular weight is complete, the "living" ends of the polymer can be reacted with the chain termination or coupling agents customary for anionic polymerization.

Suitable chain termination agents are proton-active substances or Lewis acids such as water, alcohols, aliphatic and aromatic carboxylic acids and also inorganic acids such as carbonic acid or boric acid.

For coupling the rubbers, it is possible to use polyfunctional compounds such as polyfunctional aldehydes, ketones, esters, anhydrides or epoxides, giving polydienes having a doubled molecular weight or branched or star-shaped diene polymers.

Both homopolymers and also copolymers or block copolymers are obtainable from dienes using the process of the present invention. Preference is given to preparing homopolymers, copolymers and block copolymers comprising butadiene or isoprene. Particular preference is given to polybutadiene and butadiene-styrene block copolymers. The homopolymers, copolymers and block copolymers preferably have molecular weights in the range from 10,000 to 10,000,000 g/mol, particularly preferably from 20,000 to 500,000 g/mol and very particularly preferably from 50,000 to 300,000 g/mol. The molecular weights can be controlled by the type and amount of initiator, metal alkyls used according to the present invention, temperature and conversion. Mixtures of homopolymers and copolymers can, for example, be obtained by introducing initiator at a number of different times.

Under said reaction conditions, the diene blocks contain small amounts of copolymerized vinylaromatic compounds which are asymmetrically distributed over the molecule. The amount of these which is present increases with rising conversion (Hsieh et al, Rubber, Chem. Tech. 1970, 43, 22). If a homopolydiene containing a very small amount of copolymerized vinylaromatic monomers is desired, the polymerization is advantageously stopped at a conversion of only 35–95%, preferably 40–85%, based on the dienes. The unreacted diene monomers are separated off, for example by venting, and can thus be returned to the process after condensation.

In a further embodiment of the process of the present invention, for example, the diene monomers are dissolved in the vinylaromatic compound and the polymerization is carried out in the presence of the abovementioned initiators and the polymerization-retarding metal alkyl compound until complete conversion, based on the diene monomers, is reached. As soon as the diene monomers are consumed, which can be recognized (visually or by means of a UV sensor) by the change in color of the reaction solution from yellow to red, the polymerization reaction can be stopped by addition of the abovementioned chain termination or coupling agents.

If the reaction is not stopped at the color change, ie. after the diene monomers are consumed, but at a later point in time, a block comprising vinylaromatic monomers which adjoins the diene block is obtained. This gives block copolymers or, if further diene monomers are added or coupling agents are used, multiblock copolymers or star polymers.

However, it is also possible to carry out the reaction to incomplete conversion, particularly in a continuous process, if the remaining monomers do not interfere in the intended use or subsequent reaction. In general, however, a conversion of at least 70%, preferably at least 80%, and very particularly preferably complete conversion, is desired if no removal of unreacted diene monomers is to be carried out.

For the purposes of the present invention, complete conversion means a conversion of more than 96% by weight, based on the diene component. At this degree of conversion the content of residual monomers is so low that a subsequent free-radical reaction of the reaction mixture does not lead to interfering crosslinking reactions. A conversion of more than 100% by weight based on the diene monomers, which means the formation of a vinylaromatic block adjoining the diene block, can be desirable if one wishes to obtain a diene polymer having a certain compatibility with a matrix different from the diene polymer. This can be important, in particular, if the reaction mixture is subjected to a subsequent anionic polymerization in which no grafting reactions with the diene polymer occur. In this case, the polymerization is continued until the incorporation of vinylaromatic monomers is generally in the range from 0.1 to 100% by weight, preferably from 5 to 50% by weight, based on the diene polymer.

A further process variant comprises adding the diene monomers to the reaction mixture only at a later point in time after a block of vinylaromatic monomers has already been formed. This gives, for example, styrene-butadiene block copolymers. If further initiator is also added simultaneously with the diene monomers, it is also possible to obtain rubber solutions in the vinylaromatic compound, comprising mixtures of homodienes and block copolymers, which solutions are, in particular, suitable for the subsequent anionic polymerization to give high-impact molding compositions.

The process of the present invention can be carried out in any pressure- and heat-resistant reactor. Technically, it is unimportant whether the reactors are backmixing or non-backmixing reactors (ie. reactors with stirred tank or plug flow behavior). Suitable reactors are, for example, stirred vessels, loop reactors and also tube reactors or tube-bundle reactors with or without internal fittings. Internal fittings can be static or movable fittings.

The reaction can be carried out, for example, at from 20° C. to 150° C., preferably from 30° C. to 100° C. The reaction temperature can either be kept constant or can be increased or decreased in a controlled manner. To achieve high molecular weights $M_n$ and narrow molecular weight distributions, it is not detrimental if the reaction mixture heats up within a short time as a result of the reaction enthalpy liberated.

The process of the present invention can be carried out either as a batch or continuous process. In principle, the components of the initiator composition, the solvent and the monomers can be mixed with one another in different orders. For example, all starting components can be charged initially and solvent and monomers can be added subsequently. Alternatively, the components of the initiator system can be added to the monomer solution either in separate solutions, simultaneously or in succession, or as a mixture prepared in an inert solvent or solvent system. In the batch method, the monomers can be added all at once, stepwise or continuously.

Particularly in the continuous procedure, it has been found to be advantageous to introduce initiator system and monomer solution simultaneously or virtually simultaneously, if desired under turbulent mixing conditions, into the reaction vessel. For this purpose, the monomer solution and the initiator solution are mixed, eg. in a mixing nozzle having a small volume under turbulent flow conditions, and subsequently passed through a tube having a narrow cross section, which may be equipped with static mixers (eg. SMX mixers from Sulzer). The flow rate should be sufficiently high for a relatively uniform residence time to be observed. The addition of a second monomer can be carried out in a further, downstream mixing nozzle.

For the continuous procedure, it is possible to use continuously operated stirred vessels or loop reactors, or else tube reactors or various reactor combinations. In the continuous procedure, preference is given to tube reactors, since this enables more uniform products to be obtained because of the residence time spectrum of the reaction mixture. Polymerization in two reaction zones, for example, can also be advantageous in a continuous process. The first reaction zone serves for the prepolymerization and is designed as a backmixing unit which is provided with a heat exchanger. It can, for example, be configured as a stirred vessel or as a circulation reactor with static mixers. A hydraulically filled circulation reactor can be particularly advantageous if the reaction mixture has a high viscosity. The desired conversion generally depends on the viscosity of the reaction mixture and its handlability. A high value for the conversion is advantageously selected so that the residence time to complete polymerization of the reaction mixture in the downstream tube reactor is as short as possible and the maximum temperature is as low as possible and thus damage or depolymerization reactions do not occur to any appreciable extent. In this first reaction zone, polymerization is advantageously carried out to a conversion of from 30 to 80% by weight, preferably from 40 to 60% by weight.

The diene polymer solution in a vinylaromatic monomer or monomer mixture obtained by the process of the present invention is low in specks and can, in principle, be used in all processes in which diene polymer solutions in vinylaromatic compounds are used, which is customarily achieved by dissolving the diene polymer in the vinylaromatic compound and/or additional solvents and/or further monomers. Complicated purification or filtration is therefore generally not necessary. The diene polymer solutions can, for example after chain termination but also without a discrete termination step, if desired after addition of further monomers, also of vinylaromatic compounds, various ethylenically unsaturated compounds, solvents and/or initiators, be subjected directly to an anionic polymerization or a free-radical polymerization initiated thermally or by means of free-radical initiators.

The diene polymer solutions are particularly suitable for preparing molding compositions comprising vinylaromatic monomers, for example high-impact polystyrene (HIPS), acrylonitrile-butadiene-styrene polymers (ABS) and methyl methacrylate-butadiene-styrene copolymers (MBS).

As monomers for forming the hard matrix of the molding compositions, it is possible to add to the diene polymer solution not only the abovementioned vinylaromatic monomers but also further ethylenically unsaturated compounds, in particular aliphatic vinyl compounds such as acrylonitrile, acrylic or methacrylic esters, for example the methyl, ethyl, ethylhexyl or cyclohexyl esters, maleic esters, maleic anhydride or maleimide.

Suitable free-radical initiators are peroxides, for example diacyl, dialkyl or diaryl peroxides, peroxyesters, peroxydicarbonates, peroxy ketals, peroxosulfates, hydroperoxides or azo compounds. Preference is given to using dibenzoyl peroxide, 1,1-di-tert-butylperoxycyclohexane, dicumyl peroxide, dilauryl peroxide and azobisisobutyronitrile.

Suitable anionic initiators are the alkali metal alkyls mentioned above for the diene polymer synthesis.

Auxiliaries which may be added are molecular weight regulators such as dimeric α-methylstyrene, mercaptans such as n-dodecyl mercaptan or tert-dodecyl mercaptan, chain branching agents, stabilizers and lubricants.

The polymerization of the matrix can be carried out in the same pass in bulk or in solution. The polymerization is generally carried out at from 50 to 200° C., preferably from 90 to 150° C., in the case of free-radical polymerization, or from 20 to 180° C., preferably from 30 to 80° C., in the case of anionic polymerization. The reaction can be carried out isothermally or adiabatically.

The process of the present invention offers the advantage that the molding compositions can be prepared without a costly change of reaction medium. In addition, no solvents or only small amounts of solvents are required, so that their costs and the costs of purification and work-up are largely saved.

In a particular embodiment, the preparation of the diene polymer solution and the polymerization of the matrix are carried out in a single-pass continuous process. For this purpose, for example, the diene rubber required for formation of the soft phase is polymerized as described above in a first reaction zone and is passed directly or after addition of a termination or coupling agent to a second reaction zone. In this second reaction zone, further vinylaromatic or olefinic monomers may, if desired, be added in an amount which is sufficient to achieve phase inversion and, if desired, further anionic or free-radical initiators and, if desired, solvents may be added and polymerization is carried out until phase inversion occurs. In a third reaction zone, anionic or free-radical polymerization is carried out to completion with as much vinylaromatic or olefinic monomer as is required to form the impact-modified thermoplastic molding composition.

Owing to the relatively low residual monomer content, the rubber is advantageously polymerized in a tube reactor or a reactor arrangement concluding with a tube reactor and the rubber solution is continuously transferred to a polymerization apparatus of the type used, for example, for preparing high-impact polystyrene and described in A. Echte, Handbuch der technischen Polymerchemie, VCH Verlagsgesellschaft Weinheim 1993, pages 484–489.

The molding compositions obtained can be freed of solvents and residual monomers in a customary manner by means of degassers or degassing extruders at atmospheric pressure or reduced pressure and at from 190 to 320° C.

If the matrix of the rubber-modified molding composition is also built up by anionic polymerization, it may be advantageous to crosslink the rubber particles by means of appropriate temperatures and/or by addition of peroxides, in particular those having a high decomposition temperature, for example dicumyl peroxide.

EXAMPLES

Example 1

920 g of styrene, 80 g of butadiene, 50 g of ethylbenzene and a premixed catalyst solution comprising 0.1 ml of a 1 molar s-butyllithium solution in cyclohexane and 0.6 ml of a 1 molar dibutylmagnesium solution in n-hexane were added simultaneously over a period of one hour to a 2 l stirred reactor and polymerized at 70° C. The reaction mixture was held at 70° C. until all the butadiene had been consumed, which could be recognized by the change in color of the reaction solution from yellow to red. At the color change point, the reaction was stopped using 0.1 ml of a 1:1 mixture of methanol and ethanol. This gave a viscous 7.7% strength solution of polybutadiene having a molecular weight of $M_n$=114,000 in styrene/ethylbenzene.

Examples 2–4

Example 1 was repeated using the parameters shown in Table 1.

Example 5

920 g of styrene, 80 g of butadiene, and a premixed catalyst solution comprising 0.1 ml of a 1 molar s-butyllithium solution in cyclohexane and 0.6 ml of a 1 molar dibutylmagnesium solution in n-hexane were added simultaneously over a period of one hour to a 2 l stirred reactor and polymerized at 70° C. The reaction mixture was held at 70° C. beyond the color change from yellow to red. At a solids content of 9.6% by weight, the reaction was stopped using 1 ml of a 1:1 mixture of methanol and ethanol. This gave a viscous solution of a butadiene-styrene block copolymer having a residual butadiene content of 1720 ppm and a molecular weight of $M_n=137,000$.

Examples 6–8

Example 5 was repeated using the parameters shown in Table 1.

Example 9

5100 g of styrene and 900 g of butadiene were placed in a 10 l stirred reactor and heated to 70° C. At this temperature, a premixed catalyst solution comprising 4.3 ml of a 1.4 molar s-butyllithium solution in cyclohexane and 9 ml of a 1 molar dibutylmagnesium solution in n-hexane was added. After 4.5 hours at this temperature, the reaction was stopped using 2 ml of ethanol. This gave a clear, viscous and speck-free solution having a solids content of 18.1% by weight. The polymer obtained had a molecular weight of 111,000 g/mol. The width of the distribution $M_w/M_n$ was 1.20. $^1$H-NMR analysis (CDCl$_3$; 300 MHz) showed a 1,2-vinyl content in the rubber of 10.6 mol%, based on the butadiene content, and a styrene content of 25% by weight, based on the total polymer. IR analysis indicated a cis/trans ratio of the butadiene component of 1/1.55. The glass transition temperature of the polymer was −71° C.

Example 10

4250 g of styrene and 750 g of butadiene were placed in a 10 l stirred reactor and heated to 80° C. At this temperature, a premixed catalyst solution comprising 3 ml of a 1.4 molar s-butyllithium solution in cyclohexane and 5.1 ml of a 1 molar dibutylmagnesium solution in n-hexane was added. After 3 hours at this temperature, the reaction was stopped using 2 ml of ethanol. This gave a clear, viscous and speck-free solution having a solids content of 21.4% by weight. The polymer obtained had a molecular weight of 123,000 g/mol. The width of the distribution $M_w/M_n$ was 1.66. $^1$H-NMR analysis (CDCl$_3$; 300 MHz) showed a 1,2-vinyl content in the rubber of 11.2 mol%, based on the butadiene content, and a styrene content of 44% by weight, based on the total polymer. IR analysis indicated a cis/trans ratio of the butadiene component of 1/1.49. DSC analysis gave two glass transition temperatures for the polymer, −67° C. and 102°0 C.

Comparative Example C1

In a 2 l stirred reactor, 900 g of styrene, 100 g of butadiene and a catalyst solution comprising 0.5 ml of a 1 molar s-butyllithium solution in cyclohexane were simultaneously polymerized over a period of one hour at 50° C. The reaction could be controlled only up to a conversion of 60% by weight, based on the butadiene. The temperature then rose sharply within a few minutes and only a highly crosslinked rubber could be isolated.

Comparative Example C2

In a 2 l stirred reactor, 920 g of styrene, 80 g of butadiene and a catalyst solution comprising 0.7 ml of a 1 molar s-butyllithium solution in cyclohexane were simultaneously polymerized over a period of one hour at 30° C. The reaction could be controlled only up to a conversion of 54% by weight, based on the butadiene. The temperature then rose sharply within a few minutes and only a highly crosslinked rubber could be isolated.

TABLE 1

Preparation of butadiene polymers in styrene

| | Example | | | | | | | | | |
|---|---|---|---|---|---|---|---|---|---|---|
| | 1 | 2 | 3 | 4 | 5 | 6 | 7 | 8 | C1 | C2 |
| Styrene [g] | 920 | 920 | 800 | 1000 | 920 | 867 | 920 | 920 | 900 | 920 |
| Butadiene [g] | 80 | 100 | 200 | 100 | 80 | 133 | 80 | 80 | 100 | 80 |
| Ethylbenzene [g] | 50 | | | 500 | | | | | | |
| s-BuLi [ml, 1M solution] | 0.1 | 0.1 | 0.2 | 0.2 | 0.1 | 0.13 | 0.1 | 0.1 | 0.5 | 0.7 |
| (Bu)$_2$Mg [ml, 1M solution] | 0.6 | 0.4 | 0.8 | 0.3 | 0.6 | 0.53 | 0.6 | 0.6 | | |
| Solids content [%] | 7.7 | 9.8 | 20 | 6.3 | 9.6 | 16 | 9.8 | 11.6 | | |
| Temperature [° C.] | 70 | 60 | 60 | 50 | 70 | 70 | 70 | 70 | 50 | 30 |
| Residual monomers [ppm] | | | | | 1720 | 1720 | 1680 | 1380 | | |
| Mn [g/mol] *1000 | 114 | 200 | 200 | 200 | 137 | 240 | 140 | 165 | 200 | 114 |

Examples 11–14
Continuous Preparation of High-Impact Polystyrene by Free-radical Polymerization of Styrene For the example carried out continuously, use was made of an arrangement comprising a 2 l stirred reactor (R1) for preparing the rubber solution and a downstream tank (R2)-tank(R3)-column(T1)-column(T2) arrangement with reactor volumes of 3, 5, 10 and 10 l for phase inversion and preparation of the impact-modified molding composition. The parts of the reactor arrangement were connected to one another by means of a gear pump.

The running-up phase was carried out as described in Example 1 until the color change point was reached. The connection to the tank-tank-column-column cascade was then established and the polybutadiene solution was continuously taken off, admixed with a mixture of methanol and ethanol and fed to the tank-tank-column-column cascade. In the equilibrium state, 920 g/h of styrene, 80 g/h of butadiene, 50 g/h of ethylbenzene and 1 ml/h of a premixed catalyst solution comprising 0.1 ml of a 1 molar s-butyllithium solution in cyclohexane and 0.6 ml of a 1 molar dibutylmagnesium solution in n-hexane were introduced into the 2 l stirred reactor R1 and polymerized at 70° C. In the first tank (R2), held at 115° C., of the tank-tank-column-column arrangement, styrene was grafted onto the polybutadiene at a stirrer speed of 70 rpm while metering in 84 mg/h of tert-butyl per-2-ethylhexanoate (TBPEH). Phase inversion occurred in the second tank (R3) held at 120° C. at 120 rpm. The polymerization in the first column reactor (T1) occurred at 135° C. and a stirrer speed of 70 rpm, in the second column reactor (T2) at 145° C. and 40 rpm. The solids contents were 13.4% by weight in the first tank, 26.1% by weight in the second tank and 83.7% at the outlet of the second column.

TABLE 2

Continuous preparation of high-impact polystyrene by free-radical polymerization of styrene

| | Example | | | |
|---|---|---|---|---|
| | 11 | 12 | 13 | 14 |
| Rubber prepared as in Example | 1 | 2 | 3 | 4 |
| Reactor R2 | | | | |
| TBPEH [mg/h] | 21 | 21 | 21 | 51 |
| | 84 | 80 | 70 | 85 |
| Temperatures [° C.] R2/R3/T1/T2 | 115/120/ 135/145 | 116/125/ 135/145 | 116/125/ 135/145 | 115/121/ 135/145 |
| Stirrer speed [rpm] R2/R3/T1/T2 | 70/120/ 70/40 | 70/120/ 70/40 | 70/120/ 70/40 | 70/120/ 70/40 |
| Solids content [% by weight] R2/R3/T2 | 13.4/26.1/ 83.7 | 16.3/29.1/ 85.8 | 26.5/36.1/ 86.4 | 12.2/23.1/ 83.4 |

Examples 15–18

Continuous Preparation of High-Impact Polystyrene by Anionic Polymerization

For the example carried out continuously by anionic polymerization, use was made of an arrangement comprising a 2 l stirred reactor (R1) for preparing the rubber solution, a downstream 2 l stirred reactor (R2) for phase inversion and a tube reactor having a length of 2000 mm and an internal diameter of 10 mm (volume=0.157 l). The individual reactors were connected to one another via gear pumps.

The running-up phase was carried out as described in Example 5 until a solids content of 9.6% by weight was reached. The polybutadiene solution was then continuously taken off, admixed with a mixture of methanol and ethanol and fed to the second stirred reactor R2. In the equilibrium state, 920 g/h of styrene, 80 g/h of butadiene and 1 ml/h of a premixed catalyst solution comprising 0.1 ml of a 1 molar s-butyllithium solution in cyclohexane and 0.6 ml of a 1 molar dibutylmagnesium solution in n-hexane were introduced into the 2 l stirred reactor R1 and polymerized at 70° C. In the second stirred reactor R2 which was held at 70° C., 3.86 mmol/h of dibutylmagnesium (DBM) and 0.52 mmol/h of sec-butyllithium were metered into the block copolymer solution in styrene at a stirrer speed of 70 rpm. The solids content here was 35% by weight. In the downstream tube reactor, the reaction mixture completed its polymerization at 200° C. and a residence time of 10 minutes to a solids content of 97%. The reaction product was degassed, extruded and granulated.

TABLE 3

Continuous preparation of high-impact polystyrene by anionic polymerization

| | Example | | | |
|---|---|---|---|---|
| | 15 | 16 | 17 | 18 |
| Rubber prepared as in Example | 5 | 6 | 7 | 8 |
| Reactor R2 | | | | |
| Ethylbenzene [g/h] | 21 | 21 | 71 | 71 |
| | | | 5000 | 2000 |
| s-BuLi [ml, 1M solution] | 0.52 | 0.36 | 4.38 | 5.35 |
| (Bu)$_2$Mg [ml, 1M solution] | 3.86 | 3.2 | | |
| Stirrer speed [rpm] in R2 | 70 | 70 | 70 | 70 |
| Temperature [° C.] in R2 | 70 | 40 | 40 | 40 |
| Solids content [% by weight] in R2 | 35 | 35 | 5 | 12 |
| Tube reactor R3 (Length/ internal diameter [mm]) | 2000/10 | 2000/10 | 3000/15 | 3000/15 |
| Temperature [° C.] in R3 | 200 | 200 | 150 | 150 |
| Residence time [min] in R3 | 10 | 10 | 8 | 12 |
| Solids content [% by weight] in R3 | 97 | 98 | 15.5 | 31.5 |
| Polystyrene M$_n$ [g/mol] *1000 | 200 | 250 | 200 | 158 |

We claim:

1. A process for the anionic polymerization of dienes or copolymerization of dienes and vinylaromatic monomers in a vinylaromatic monomer or monomer mixture as solvent to give homopolydienes or copolymers or mixed homopolydienes and copolymers, wherein the polymerization is carried out in the presence of an initiator composition consisting of an alkali metal alkyl or aryl as initiator and a metal alkyl or aryl of an element having a valence of at least two selected from the group consisting of magnesium, aluminum, boron and zinc and without addition of Lewis bases and using less than 40% by volume of a further solvent, based on the vinylaromatic monomer or monomer mixture.

2. A process as claimed in claim 1, wherein the metal alkyl or aryl used is a compound of the formula (I)

$$R_nM \qquad (I)$$

where
M is magnesium, aluminum, boron or zinc,
R are, independently of one another, hydrogen, halogen, $C_1$–$C_{20}$-alkyl or $C_6$–$C_{20}$-aryl and
n is 2 or 3, corresponding to the valence of the element M with the proviso, that at least one radical R is $C_1$–$C_{20}$-alkyl or $C_6$–$C_{20}$-aryl.

3. A process as claimed in claim 2, wherein the metal alkyl used is diethylzinc, butylethylmagnesium, dibutylmagnesium, dihexylmagnesium, butyloctylmagnesium, triisobutylaluminum, trihexylaluminum, triethylaluminum, trimethylaluminum, diethylaluminum chloride or diethylaluminum hydride.

4. A process as claimed in claim 1, wherein the metal alkyl or aryl is used in a molar ratio of from 0.5/1 to 50/1, based on the amount of initiator.

5. A process as claimed in claim 1, wherein the further solvent used is an aliphatic, cycloaliphatic or aromatic hydrocarbon or a mixture thereof.

6. A process as claimed in claim 1, wherein the diene used is butadiene or isoprene.

7. A process as claimed in claim 1, wherein the vinylaromatic monomer used is styrene, α-methylstyrene, p-methylstyrene, 1,1-diphenylethylene or a mixture thereof.

8. A process as claimed in claim 1, wherein the polymerization is stopped using a chain termination agent or coupling agent.

9. A process for the continuous preparation of impact-modified, thermoplastic molding compositions which comprise a soft phase comprising a diene polymer dispersed in a hard vinylaromatic matrix, which comprises preparing, as claimed in claim 1 the diene polymer required for the formation of the soft phase in a first reaction zone, feeding the diene polymer obtained in this way, either directly or after addition of a termination or coupling agent, to a second reaction zone in which, optionally with addition of further vinyl monomers in an amount which is sufficient to achieve phase inversion and, optionally, further initiators and/or solvents, anionic or free-radical polymerization is carried out until phase inversion occurs and in a third reaction zone, anionic or free-radical polymerization is continued until complete with the amount of vinylaromatic monomer required to form the impact-modified thermoplastic molding composition.

10. A process as claimed in claim 1, wherein styrene, acrylonitrile or methylmethacrylate is added to the obtained solution of diene polymer and the mixture is subjected to anionic polymerization or free-radical polymerization initiated thermally or by means of free-radical initiators.

* * * * *